(12) United States Patent
Dochterman et al.

(10) Patent No.: US 12,741,729 B1
(45) Date of Patent: Sep. 22, 2026

(54) MARINE PROPULSION CONTROL SYSTEM AND METHOD WITH ISOLATED ROTATION CONTROL

(71) Applicant: Brunswick Corporation, Mettawa, IL (US)

(72) Inventors: David W. Dochterman, Panama City, FL (US); David M. Heap, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 281 days.

(21) Appl. No.: 17/902,686

(22) Filed: Sep. 2, 2022

(51) Int. Cl.
*B63H 20/12* (2006.01)
*G05D 1/00* (2006.01)
*G05G 9/047* (2006.01)

(52) U.S. Cl.
CPC ........... *B63H 20/12* (2013.01); *G05D 1/0206* (2013.01); *G05G 9/047* (2013.01); *G05G 2009/04774* (2013.01)

(58) Field of Classification Search
CPC .................. B63H 20/12; G05G 9/047; G05G 2009/04774
USPC .......................................................... 701/21
See application file for complete search history.

(56) References Cited

U.S. PATENT DOCUMENTS 6,234,853 B1 5/2001 Lanyi et al.
6,402,577 B1 6/2002 Treinen et al.
6,538,217 B1 * 3/2003 Eriksen ................ B63H 21/213 200/61.58 R
7,467,595 B1 12/2008 Lanyi et al.
9,039,468 B1 5/2015 Arbuckle et al.
9,248,898 B1 * 2/2016 Kirchhoff .............. B63H 25/42
9,387,916 B2 * 7/2016 Skauen .................. B63H 25/42
(Continued)

FOREIGN PATENT DOCUMENTS

WO WO-2006062416 A1 * 6/2006 ............. B63H 21/22
WO WO-2009109509 A1 * 9/2009 ............... G05G 5/02
(Continued)

OTHER PUBLICATIONS

Sleipner Motor As, Side-Power Thruster Systems, PJC-222 S-link Control Panel. Installation and user's manual 2012.
(Continued)

*Primary Examiner* — Kito R Robinson
*Assistant Examiner* — Alexander V Gentile
(74) *Attorney, Agent, or Firm* — Andrus Intellectual Property Law, LLP

(57) ABSTRACT

A marine propulsion control system for a marine vessel includes a plurality of marine drives configured to propel the marine vessel in each of a surge direction, a sway direction, and a yaw direction, and a joystick configured to receive an isolated rotation input to demand rotation about a bow of the marine vessel or rotation about a stern of the marine vessel, and to receive a surge demand input, a sway demand input, and a yaw demand input. A control system is configured to control the plurality of marine drives to effectuate vessel rotation about the bow of the marine vessel or about the stern of the marine vessel based on the isolated rotation input and the yaw demand input, and to effectuate surge movement of the marine vessel based on the surge demand input and sway movement of the marine vessel based on the sway demand input.

19 Claims, 12 Drawing Sheets

(56) References Cited

U.S. PATENT DOCUMENTS

| | | | | |
|---|---|---|---|---|
| 10,202,179 | B2 * | 2/2019 | Wong | B63H 20/06 |
| 10,259,555 | B2 | 4/2019 | Ward et al. | |
| 10,926,855 | B2 | 2/2021 | Derginer et al. | |
| 2021/0362821 | A1 | 11/2021 | Morvillo | |

FOREIGN PATENT DOCUMENTS

| | | | | |
|---|---|---|---|---|
| WO | WO-2014038953 | A1 * | 3/2014 | B63H 21/21 |
| WO | WO-2020007471 | A1 * | 1/2020 | B63H 25/02 |

OTHER PUBLICATIONS

Derginer, Unpublished U.S. Appl. No. 17/672,339, filed Feb. 15, 2022.

Lewmar Thruster Controller Systems. Joystick used to control both a bow and stern thruster. See https://www.lewmar.com/sites/default/files/Thruster%20Controller%20Systems_0.pdf.

* cited by examiner

MARINE PROPULSION CONTROL SYSTEM AND METHOD WITH ISOLATED ROTATION CONTROL

FIELD

The present disclosure generally relates to methods and systems for propelling marine vessels, and more particularly to systems and methods for providing rotational propulsion and user control of vessel rotation.

BACKGROUND

Many different types of marine drives are well known to those skilled in the art. For example, steerable marine drives mounted to the rear of the vessel, such as outboard motors that are attached to the transom of a marine vessel and stern drive systems that extend in a rearward direction from the stern of a marine vessel, may be provided in groups of two or more and separately steerable to enable surge, sway, and yaw directional control, sometimes referred to as joysticking. The steerable marine drives are each steerable about their steering axis to a range of steering angles, which is effectuated by a steering actuator. Lateral marine drives may be positioned to exert lateral force on the marine vessel, such as bow thrusters and/or stern thrusters. Marine drives generally comprise a powerhead, such as an electric motor or an internal combustion engine, driving rotation of a drive shaft that is directly or indirectly connected to a propeller on a propeller shaft and that imparts rotation thereto.

The following U.S. Patents are incorporated herein by reference, in entirety:

U.S. Pat. No. 6,234,853 discloses a docking system that utilizes the marine propulsion unit of a marine vessel, under the control of an engine control unit that receives command signals from a joystick or push button device, to respond to a maneuver command from the marine operator. The docking system does not require additional marine drives other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone.

U.S. Pat. No. 6,402,577 discloses a hydraulic steering system in which a steering actuator is an integral portion of the support structure of a marine propulsion system. A steering arm is contained completely within the support structure of the marine propulsion system and disposed about its steering axis. An extension of the steering arm extends into a sliding joint which has a linear component and a rotational component which allows the extension of the steering arm to move relative to a moveable second portion of the steering actuator. The moveable second portion of the steering actuator moves linearly within a cylinder cavity formed in a first portion of the steering actuator.

U.S. Pat. No. 7,467,595 discloses a method for controlling the movement of a marine vessel that rotates one of a pair of marine drives and controls the thrust magnitudes of two marine drives. A joystick is provided to allow the operator of the marine vessel to select port-starboard, forward-reverse, and rotational direction commands that are interpreted by a controller which then changes the angular position of at least one of a pair of marine drives relative to its steering axis.

U.S. Pat. No. 9,039,468 discloses a system that controls speed of a marine vessel that includes first and second marine drives that produce first and second thrusts to propel the marine vessel. A control circuit controls orientation of the marine drives between an aligned position in which the thrusts are parallel and an unaligned position in which the thrusts are non-parallel. A first user input device is moveable between a neutral position and a non-neutral detent position. When the first user input device is in the detent position and the marine drives are in the aligned position, the thrusts propel the marine vessel in a desired direction at a first speed. When a second user input device is actuated while the first user input device is in the detent position, the marine drives move into the unaligned position and propel the marine vessel in the desired direction at a second, decreased speed without altering the thrusts.

U.S. Pat. No. 10,259,555 discloses a method for controlling movement of a marine vessel near an object that includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,926,855 discloses a method for controlling low-speed propulsion of a marine vessel powered by a marine propulsion system having a plurality of propulsion devices that includes receiving a signal indicating a position of a manually operable input device movable to indicate desired vessel movement within three degrees of freedom, and associating the position of the manually operable input device with a desired inertial velocity of the marine vessel. A steering position command and an engine command are then determined for each of the plurality of propulsion devices based on the desired inertial velocity and the propulsion system is controlled accordingly. An actual velocity of the marine vessel is measured and a difference between the desired inertial velocity and the actual velocity is determined, where the difference is used as feedback in subsequent steering position command and engine command determinations.

U.S. patent application Ser. No. 17/672,339 discloses a marine propulsion system for propelling a marine vessel including at least two steerable rear marine drives that each generate forward and reverse thrusts, wherein each rear marine drive is independently steerable to a range of steering angles, and a lateral marine drive configured to generate starboard and port thrusts on the marine vessel. The system further includes a user input device, such as a joystick, operable by a user to provide a propulsion demand input commanding lateral movement of the marine vessel and rotational movement of the marine vessel. A control system is included that is configured to control steering and thrust of each of the at least two rear marine drives and thrust of the lateral marine drive based on the propulsion demand input so as to generate the lateral movement and/or the rotational movement commanded by the user.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one aspect of the present disclosure, a marine propulsion control system for a marine vessel includes a plurality of marine drives configured to propel the marine vessel in each of a surge direction, a sway direction, and a yaw direction, a joystick configured to receive an isolated rotation input to demand rotation about a bow of the marine vessel or rotation about a stern of the marine vessel, and to receive a surge demand input, a sway demand input, and a yaw demand input. A control system is configured to control the plurality of marine drives to effectuate vessel rotation about the bow of the marine vessel or about the stern of the marine vessel based on the isolated rotation input and the yaw demand input, and to effectuate surge movement of the marine vessel based on the surge demand input and sway movement of the marine vessel based on the sway demand input.

In one embodiment, the joystick includes an oblong handle having a length that is aligned with a long axis of the marine vessel and a width that is less than the length.

In a further embodiment, the oblong handle is connected to at least one post connected to a rear detent that facilitates deflection of only a front of the oblong handle in response to a lateral force on the front to demand the rotation about the stern of the marine vessel and a front detent that facilitates deflection of only a back of the oblong handle in response to lateral force on the back to demand the rotation about the bow of the marine vessel.

In another embodiment, the joystick includes a selection device configured to enable a user to select the rotation about the bow of the marine vessel and to select the rotation about the stern of the marine vessel.

Another aspect of the present disclosure is a joystick for controlling propulsion of a marine vessel that includes a base, an oblong handle having a length configured to be aligned with a long axis of the marine vessel and a width that is less than the length, at least one post connecting the oblong handle to the base, and at least a rear detent and a front detent connected to the at least one post. The rear detent is configured to hold a back portion of the oblong handle in place to facilitate deflection of only a front portion of the oblong handle in response to a lateral force on the front portion of the oblong handle to receive an isolated rotation input to demand rotation about a stern of the marine vessel. The front detent is configured to hold a front portion of the oblong handle in place to facilitate deflection of only a back portion of the oblong handle in response to lateral force on the back portion to receive an isolated rotation input to demand rotation about a bow of the marine vessel.

Another aspect of the present disclosure is a method of controlling propulsion for a marine vessel, wherein the method includes receiving joystick position information and, based on the joystick position information, identifying an isolated rotation input demanding rotation about a bow of the marine vessel or rotation about a stern of the marine vessel and a yaw demand. A plurality of marine drives is controlled to effectuate vessel rotation about the bow of the marine vessel or about the stern of the marine vessel based on the isolated rotation input and the yaw demand input.

In one embodiment, identifying the isolated rotation input based on the joystick position information includes identifying a position of each of a front point on an oblong handle and a back point on the oblong handle on the joystick, and identifying the isolated rotation input based on the position of each of the front point and the back point.

In another embodiment, controlling the plurality of marine drives includes controlling at least one steering actuator to adjust a splay angle of at least two rear marine drives to control a point of rotation of the marine vessel and effectuate the rotation about the bow of the marine vessel or the stern of the marine vessel based on the isolated rotation input and the yaw demand.

In another embodiment, controlling the plurality of marine drives includes controlling at least one rear marine drive and at least one lateral marine drive to control a point of rotation of the marine vessel and effectuate the rotation about the bow of the marine vessel or the stern of the marine vessel based on the isolated rotation input and the yaw demand.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
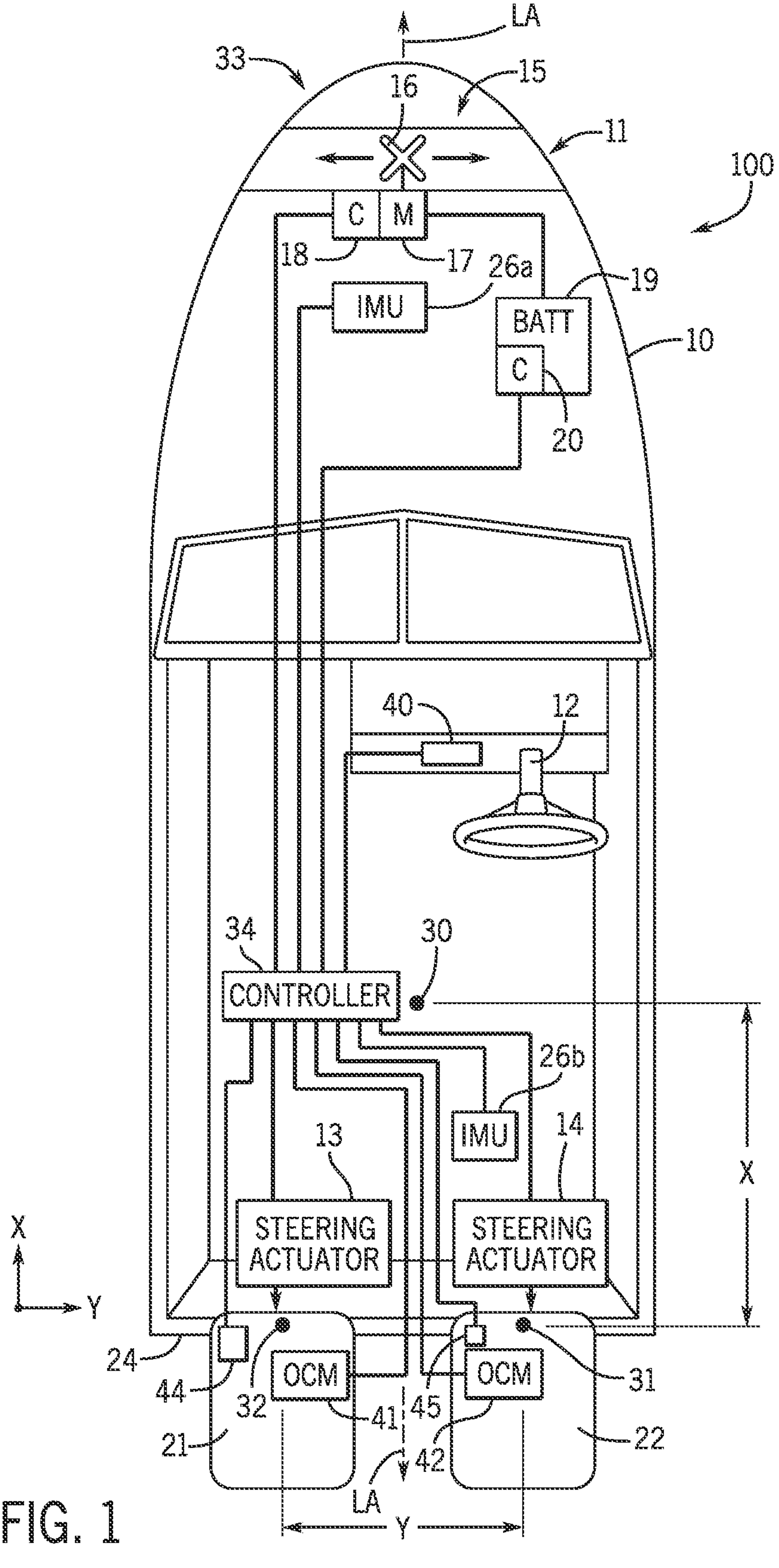
FIG. 1 is a schematic illustration of a marine vessel with one embodiment of a propulsion system according to the present disclosure.

The inventors have recognized a need for vessel control systems and methods that provide improved control over lateral and rotational movement of the marine vessel. In particular, the inventors have recognized a need for an improved user input device that enables user control over the point of rotation of the marine vessel. Current joysticks enable a user to twist the joystick to demand rotation of the marine vessel about its center of gravity (COG) or its natural center of turn (COT). However, the inventors have recognized that there are situations where a user desires to demand rotation of just the bow while the stern stays in place (e.g., demand the vessel to rotate about its stern) and/or to demand rotation of just the stern while the bow stays in place (e.g., demand the vessel to rotate about its bow). The need to perform these types of isolated rotations increases as the vessel length increases because the longer the vessel from stern to bow, the greater the distance both the bow and the stern will move when the vessel spins about its COG making maneuvering in tight spaces more difficult. Where the bow or the stern are in close proximity to an obstacle, such as during docking, there is often a need to move just that portion of the vessel away from the object without having a corresponding opposite movement from the other end—e.g., to move the bow away from an object without also moving the stern of the vessel.

In view of the foregoing problems and challenges in the relevant art, the inventors developed the disclosed joystick systems and methods that provide the user the ability to control the location of the center of rotation of the marine vessel to demand rotation of just the bow or just the stern of the vessel. The disclosed joystick is configured to enable to user to input an isolated rotation input demanding isolated rotation of the bow of the vessel, where the vessel rotates about the stern, and to input an isolated rotation input demanding isolated rotation of the stern of the vessel, where the vessel rotates about the bow. The joystick is configured for the user to select a front point of rotation or a back point of rotation when demanding vessel rotation, including a rotation direction and magnitude or velocity. As discussed below, the joystick may be provided with various user input elements that facilitate user selection of the front point of rotation and the rear point of rotation. For example, the joystick may include a set of buttons, a slide switch, a toggle switch, or a track point configured to enable the user to select front or back rotation.

Alternatively, the joystick may be constructed such that the user can move the handle in ways that specify isolated front or rear rotation. In one such embodiment, the joystick includes a handle configured to rotate forward and rearward about a connection point to a center post, and wherein the rotation of the handle forward and rearward is the selection device configured to enable user selection of the front point of rotation and the rear point of rotation. In another such embodiment, the joystick includes an oblong handle with a length that is aligned with a long axis of the marine vessel and a width that is less than the length. The joystick is configured such that each end of the oblong handle is separately rotatable—i.e., a user can move the front end of the oblong handle without moving the back end, and likewise can move the back end without moving the front end. For example, the joystick handle may be connected to a front post providing a front detent that resists rotation of the front end of the oblong handle, and a back post providing a back detent that resists rotation of the back end of the oblong handle. Pressing laterally on the front end of the oblong handle deflects only the front end and rotates the handle about the rear post. Pressing laterally on the rear end of the oblong handle deflects only the rear end and rotates the handle about the front post. The propulsion system is configured such that propulsion commands associated with these handle rotations correspond with the rotation orientation, magnitude, and direction of the oblong handle such that the resulting vessel rotation mimics the handle rotation—i.e. rotating the oblong handle about the rear post is interpreted as demanding isolated rotation of the bow of the vessel and rotating the oblong handle about the front post is interpreted as demanding isolated rotation of the stern of the vessel.

FIG. 1 is a schematic representation of a marine vessel 2 equipped with propulsion system 100 including two rear marine drives 21 and 22 positioned at the stern 24, such as attached to the transom. The number and configuration of marine drives shown are exemplary and a person having ordinary skill in the art will understand in light of the present disclosure that any number of two or more marine drives may be utilized in the disclosed system and method. Each rear marine drive 21, 22 is individually and separately steerable, each having a respective steering actuator 13, 14 configured to rotate the drive 21, 22 about its respective steering axis 31, 32. The steering axes 31 and 32 are separated by a dimension Y and at a distance X from the natural center of turn 30 (COT) near the center of the vessel 10, which could also be the effective center of gravity (COG). The marine vessel 10 is maneuvered by causing the first and second marine drives to rotate about their respective steering axis 31 and 32. The rear marine drives 21 and 22 are rotated in response to an operator's manipulation of the steering wheel 12 or user input device 40, which is communicatively connected to the steering actuators 13, 14, which rotate the marine drives 21 and 22. Rotating the rear marine drives 21 and 22 and effectuating thrusts thereby cause rotation of the marine vessel 10 about the effective COT 30.

The propulsion system 100 shown in FIG. 1 further includes a lateral marine drive 15 configured to effectuate lateral thrust on the vessel 10 in the starboard and port directions. The lateral marine drive may be mounted in an area of the bow of the marine vessel and controllable in forward and reverse directions to generate starboard and port directional thrusts at the bow. The starboard and port thrusts, including the yaw moment of the lateral marine drive thrust, are integrated into and accounted for in the propulsion control scheme such that the thrusts generated by the lateral marine drive and the plurality of rear marine drives are totaled and each individual drive is controlled so that the total sway thrust effectuated by all drives in the propulsion system results in the commanded lateral sway movement and/or surge movement and the total yaw thrust effectuated by all drives in the propulsion system results in the commanded rotational yaw movement (or lack thereof), including the isolated rotation of only the bow or only the stern. Alternatively or additionally, the propulsion system 100 may include one or more lateral marine drives, such as thrusters, mounted on the sides or stern of the vessel. For example, the system 100 may include rear thrusters mounted on the port and starboard sides of the vessel at or near the stern which are configured to generate isolated thrust on the stern.

In the depicted example, the lateral marine drive 15 is an electric drive positioned at a bow 11 of vessel 10 configured to effectuate lateral thrust at the bow, which may also be referred to as a bow thruster. Bow thrusters are known to those skilled in the art, as are other types and locations of marine drive arrangements configured to only effectuate lateral thrusts on the vessel, which may be placed at other locations on the vessel 10 such as the stern 24. The lateral marine drive 15 may be a discrete drive, or discrete thruster, that operates only at a predetermined RPM and thus is only controllable by turning on and off the drive. Alternatively, the lateral marine drive 15 may be a proportional drive, or proportional thruster, wherein the rotational speed (e.g., rotations per minute RPM) is controllable by the control system 33 between a minimum RPM and a maximum RPM that the drive is rated to provide. A person having ordinary skill in the art will understand in view of the present disclosure that the disclosed propulsion system 100 may include other types and locations of lateral marine drives 15, such as stern thrusters or thrusters at other locations, which may be an alternative to or in addition to a lateral drive positioned at the bow.

The lateral marine drive 15 includes a propeller 16, sometimes referred to as a fan, that is rotated by a bi-directional motor 17 in forward or reverse direction to effectuate lateral thrust in the starboard and port directions. The controller 34 may be communicatively connected to a drive controller 18 for the lateral marine drive 15 to control activation and direction of thrust by the lateral marine drive 15. Where the lateral drive 15 is configured as a discrete drive, the controller 18 provides on/off and directional control of the motor 17, which rotates in the clockwise and counterclockwise directions at a single speed. In other embodiments, the lateral marine drive 15 is a variable speed drive, wherein the motor 17 is controllable to rotate the propeller 16 at two or more speeds. For example, motor 17 may be a brushless DC motor configured for variable multi-speed control of the propeller 16 in both the clockwise and counterclockwise rotation directions.

Where one or more of the marine drives 15, 21, 22 is an electric drive—i.e., have a powerhead being an electric motor—the propulsion system 100 will include a power storage device 19 powering the motor(s) thereof. The power storage device, such as a battery or bank of batteries, stores energy for powering the electric motor(s) (e.g., motor 17) and is rechargeable, such as by connection to shore power when the electric motor is not in use or by an on-board alternator system drawing energy from engine-driven marine drives (if any) on the marine vessel. The power storage device 19 may include a battery controller 20 configured to monitor and/or control aspects of the power storage device 19. For example, the battery controller 20 may receive inputs from one or more sensors within the power storage device 19, such as a temperature sensor configured to sense a temperature within a housing of the power storage device where one or more batteries or other storage elements are located. The battery controller 20 may further be configured to receive information from current, voltage, and/or other sensors within the power storage device 19, such as to receive information about the voltage, current, and temperature of each battery cell within the power storage device 19. In addition to the temperature of the power storage device, the battery controller 20 may be configured to determine and communicate a charge level to the central controller 34 and/or other controller within the control system 33. The charge level may include one or more of, for example, a voltage level of the power storage device, a state of charge of the power storage device 19, a state of health of the power storage device 19, etc.

Figures 2A, 2B:
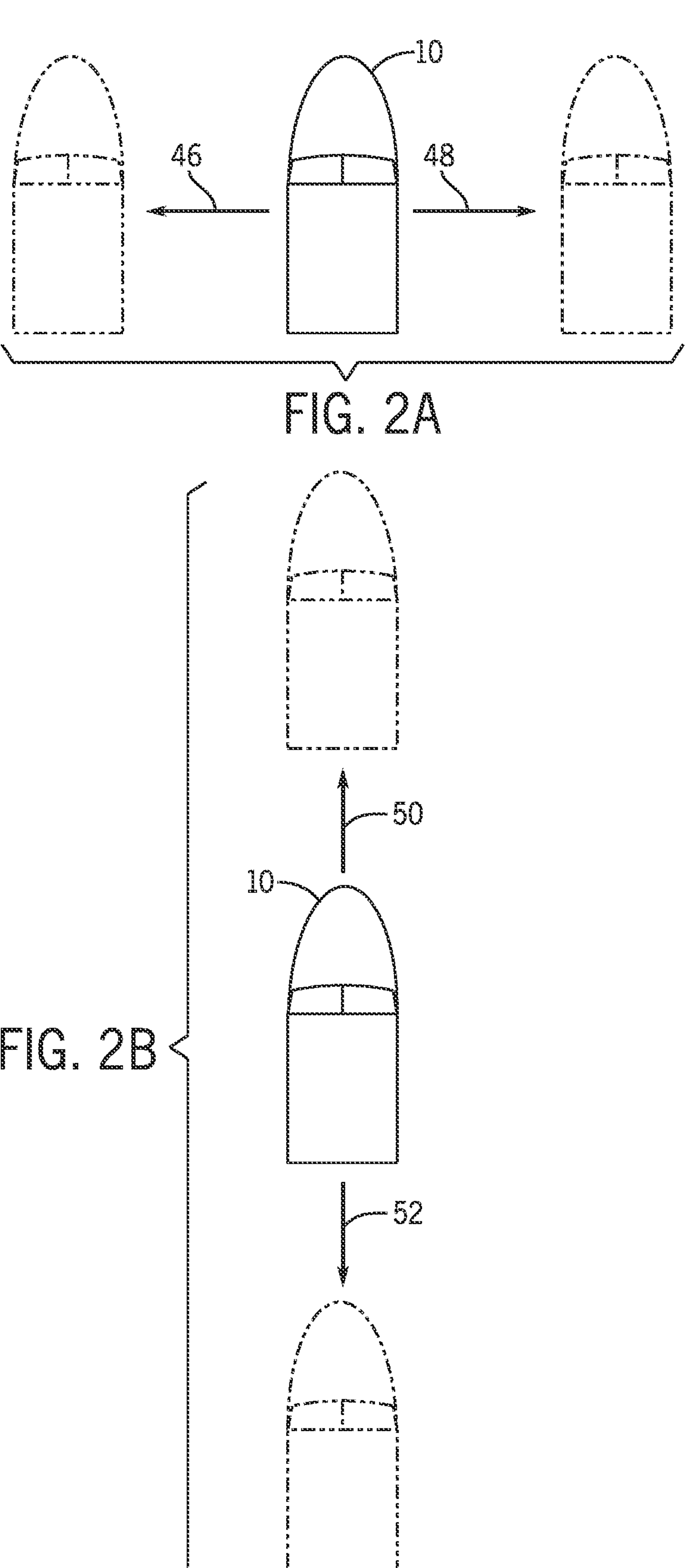
FIGS. 2A-2E are schematic illustrations of various movements of a marine vessel.
Figure 2C:
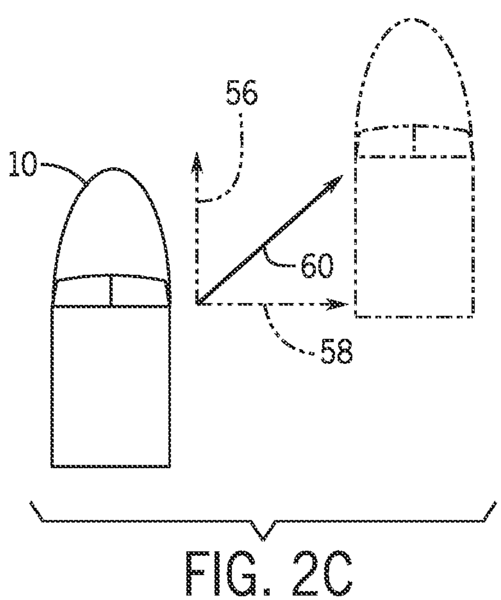
Figure 2D:
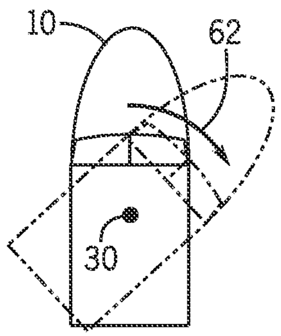
Figure 2E:
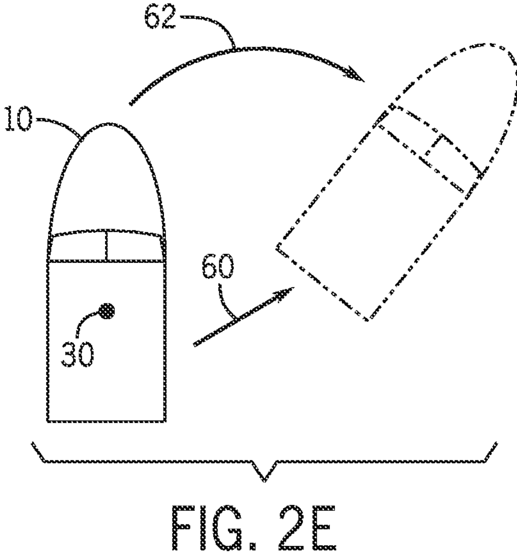

The propulsion system 100 further includes a user input device 40, such as a joystick, operable by a user to provide at least a lateral movement demand input and rotational movement demand input, including the isolated rotation input as described herein. The user input device enables a user to give a lateral propulsion demand commanding sway movement of the marine vessel, or longitudinal movement along the y-axis, without requiring surge movement along the x-axis. The user input device also enables a user to give a rotational propulsion demand input commanding rotational movement of the marine vessel 10 without lateral or surge movements. FIGS. 2A-2E illustrate exemplary vessel movements that are commanded via the user input device 40, which are standard motion commands for joysticking. FIG. 2A shows the vessel 10 moving laterally, or sway movement, in the port direction 46 and the starboard direction 48 without any forward or reverse motion and without any rotation about its COT 30. FIG. 2B shows the vessel 10 moving in the forward 50 direction and backward 52 direction, also known as surge movement. FIG. 2C shows a combination of forward surge and starboard sway motions of the vessel 10, where the surge movement is represented by the dashed arrow 56 and the sway movement is represented by the dashed arrow 58. The resultant motion vector 60 moves the vessel in the forward and starboard directions without any rotation. FIG. 2D illustrates a clockwise rotation 62, or yaw movement, of the marine vessel 10 about the COT 30 without any translation movement, including any surge movement or sway movement. FIG. 2E illustrates a combination of yaw movement, represented by arrow 62, and surge and sway translation in the forward and starboard directions, represented by arrow 60.

The disclosed system and method enable lateral and rotational movement of the marine vessel, such as that illustrated in FIGS. 2A-2E, by effectuating steering and thrust control of the marine drives 21 and 22 and/or thrust control of the lateral marine drive 15. By effectuating a forward thrust by one of the rear marine drives 21 or 22 and a reverse thrust by the other, the coupled forces will impart a torque about the COT 30. The torque imparted will depend on the magnitude and steering angle of each rear marine drive. The basic vector calculations involved in joystick control are known in the relevant art. If the drive angle of the marine drives is known, then vector analysis can be performed to effectuate any rotational movement and, in an embodiment incorporating a lateral marine drive 15, lateral movement in the port direction 46 and the starboard direction 48, as well as forward direction 50 and reverse direction 52 movement. The system 100 is configured to provide translational movement in other translational directions combining forward/reverse and port/starboard thrusts of the rear and lateral drives 21-22 and 15.

The user steering inputs provided at the joystick user input device 40 are received by the control system 33, which may include multiple control devices communicatively connected via a communication link, such as a CAN bus (e.g., a CAN Kingdom Network), to control the propulsion system 100 as described herein. The control system 33 is configured to operate the plurality of marine drives included in the propulsion system, such as the lateral marine drive 15, the plurality of rear marine drives 21 and 22, or both simultaneously depending on the propulsion demand input. For certain yaw motions and yaw demand ranges, the control system may be configured to operate only the lateral marine drive or only the plurality of rear marine drives to generate the commanded thrust. For example, the control system may be configured to operate only the lateral marine drive to effectuate isolated rotation of the bow when the demand input is within a low yaw demand range.

In the embodiment of FIG. 1, the control system 33 includes a central controller 34 communicatively connected to the drive control module (DCM) 41 and 42 of each rear marine drive 21 and 22, respectively, the DCM 18 of the lateral marine drive 15, and may also include other control devices such as the battery controller 20. Thereby, the controller 34 can communicate instructions to each DCM 41 and 42 of the rear drives to effectuate a commanded magnitude of thrust and a commanded direction of thrust (forward or reverse), as is necessary to effectuate the lateral and/or rotational steering inputs commanded at the user input device 40. The controller also communicates a steering position command to each steering actuator 13 and 14 to separately steer each marine drive 21, 22. Drive position sensors 44 and 45 are configured to sense the steering angle, or steering position, of the drives 21 and 22, respectively. The central controller 34 also communicates a command instruction to the DCM 18 for the lateral marine drive, wherein the commands are coordinated such that the total of the thrusts from the rear and lateral marine drives yields the user's propulsion demand input. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Figure 3:
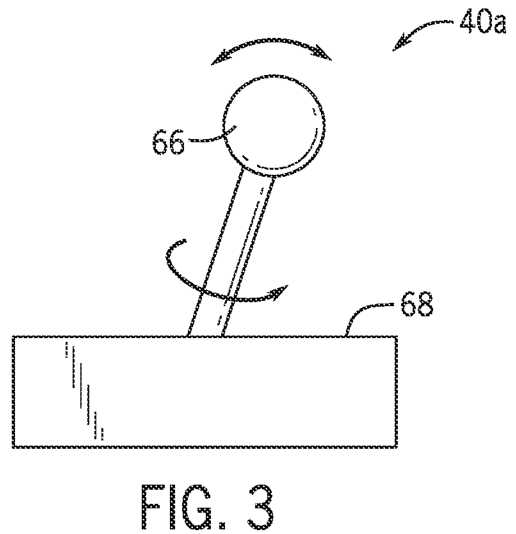
FIG. 3 illustrates an exemplary joystick user input device.

FIG. 3 depicts a well-known standard joystick user input device 40 that comprises a base 68 and a moveable handle 66 suitable for movement by an operator. Typically, the handle can be moved left and right, forward and back, as well as rotated relative to the base 68 to provide corresponding movement commands for the propulsion system illustrated in FIGS. 2A-2E. The inventors have recognized that standard joysticks are not configured to provide user input to control the point of rotation of the vessel and are only configured to allow a user to control vessel rotation about the center. Thus, current joysticks to do not enable a user to command and control vessel rotation about the bow or about the stern.

Figure 4:
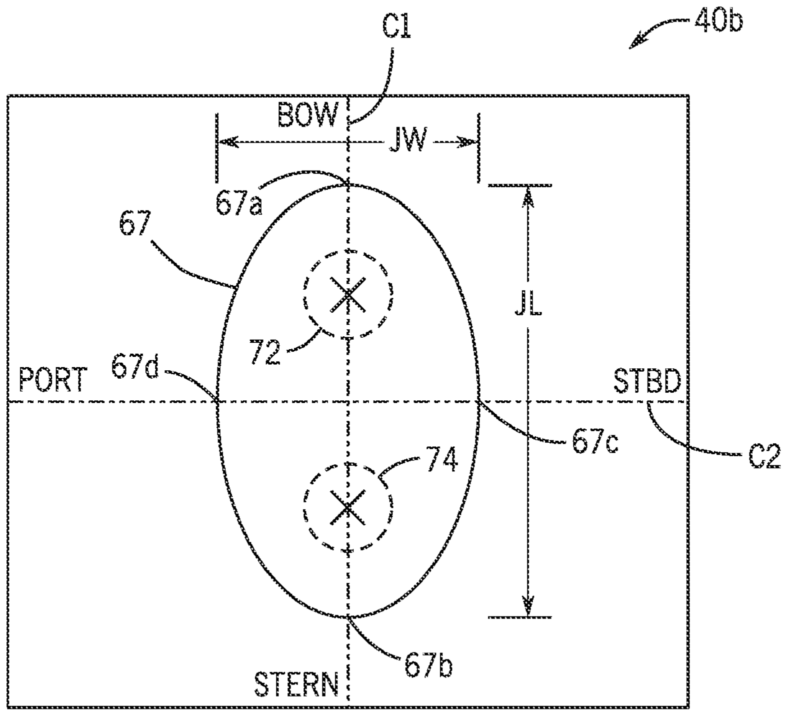
FIG. 4 is a diagram illustrating one embodiment of a joystick with an oblong handle configured to facilitate an isolated rotation input in accordance with the present disclosure.

In addition to generating joystick position information regarding the forward, backward, and rotational positions of the joystick handle, the disclosed joystick is also configured to provide position information relating to selection of the point of rotation for the marine vessel. FIG. 4 illustrates one embodiment of a joystick that enables a user to selectively demand isolated rotation about the bow and the stern of the marine vessel in addition to the standard joystick commands of surge, sway, and rotation about the center illustrated in FIGS. 2A-2E. The joystick 40*b*, includes an oblong handle 67 having a length JL and a width JW. The length JL is greater than the width JW. In the depicted example, the handle 67 is oval shaped. However, in other embodiments the handle 67 may be any oblong shape, such as a rectangle, a diamond, an elongated triangle, a pentagon with elongated sides, or any other elongated shape with a length that is significantly greater than the width. To provide just one example, the oblong handle 67 may have a length JL that is at least 1.5 times greater than its width JW. In another embodiment, the length JL of the oblong handle 67 is at least two times greater than its width JW.

The length JL of the oblong handle 67 is aligned with the long axis LA (see FIG. 1) of the vessel 10 when the handle is in its neutral position such that the handle serves to represent the demanded motion of the marine vessel 10. In the neutral position, the center length axis of the handle length JL is aligned with the longitudinal centerline C1 and the center width axis of the handle width JW is aligned with the lateral centerline C2. When in the neutral position, the oblong handle 67 has a front end 67*a* that is closer to the bow 11, a back end 67*b* closer to the stern 24 of the vessel, a right side 67*c* closer to the starboard side of the vessel, and a left side 67*d* closer to the port side of the vessel. There is a front point 72 and a back point 74 on the handle. The control system 33 is configured to identify the isolated rotation input based on the position of each of the front point 72 and the back point 74 on the oblong handle 67. A sensor system is configured to identify the position of each of the front point 72 and the back point 74, which may comprise different sensor arrangements as explained in more detail below. Thus, the position of the front point 72 and the back point 74 is position information identifying the point of rotation demanded.

Figures 5A, 5B, 5C:
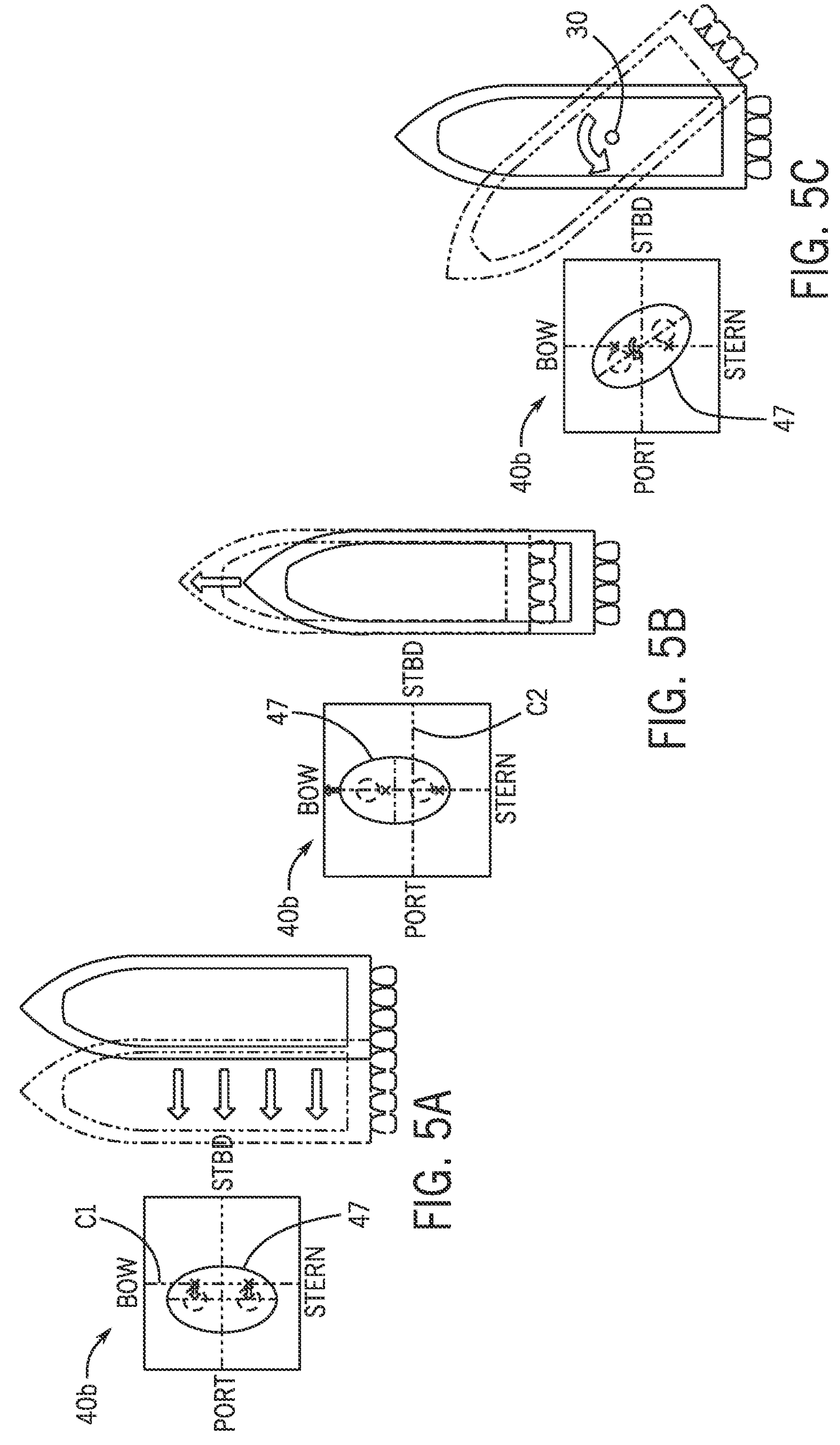
FIGS. 5A-5E illustrate an exemplary joystick configured to receive an isolated rotation input in accordance with the present disclosure, and a corresponding vessel response.

FIGS. 5A-5E represent joystick movements of the joystick 40*b* with the elongated handle and associated vessel movement demands of the marine vessel. FIG. 5A illustrates a joystick 40*b* input associated with a sway demand. The entire oblong handle 47 is pushed laterally towards the left to demand a port-side sway motion, such that the center length axis is moved away from the longitudinal centerline C1 (but remains horizontal thereto). FIG. 5B illustrates a joystick 40*b* input associated with a forward surge demand, where the entire oblong handle is pushed forward. Thus, the center width axis is moved away from the longitudinal centerline C2, thus demanding a surge motion to be effectuated by the propulsion system 100. FIG. 5C illustrates a joystick 40*b* input associated with a yaw demand about the vessel's center 30, such as its natural center of turn.

Figure 5E:
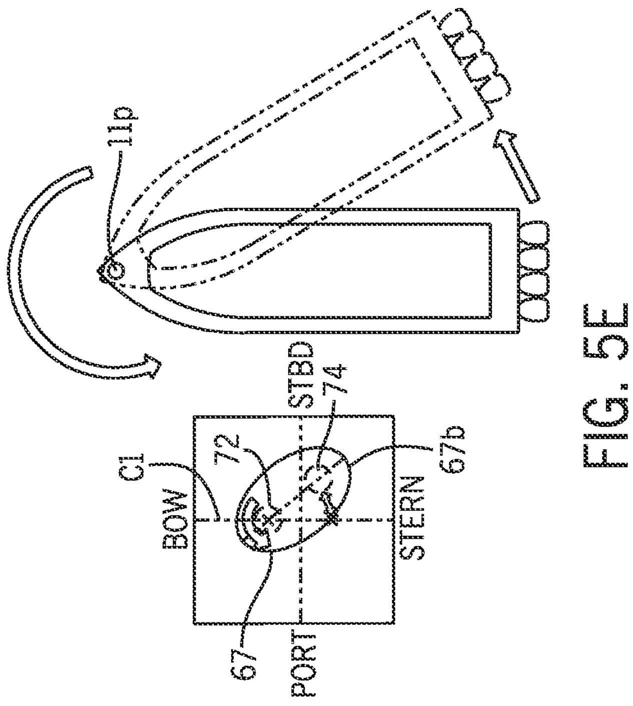
Figure 5D:
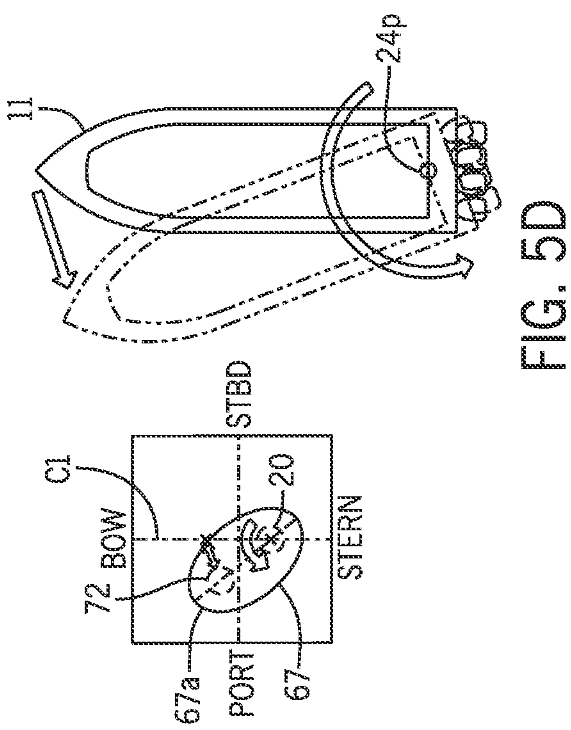

In addition, the joystick 40*b* is configured to receive isolated rotation inputs to demand rotation of the marine vessel about the bow 11 and rotation about the stern 24. FIG. 5D illustrates a joystick 40*b* input associated with a demand to rotate the marine vessel about a point 24*p* at the stern 24, or rear region, of the marine vessel 10. The oblong handle 67 of the joystick 40*b* is rotated about the back point 74 such that only the front portion of the oblong handle 67 including the front point 72 moves laterally away from the longitudinal centerline C1, but the back point 74 remains on the centerline C1. Thus, the movement of the oblong handle 67 mimics the desired movement of the marine vessel 10. Similarly, FIG. 5E illustrates a joystick 40*b* input associated with a demand to rotate the marine vessel about a point 11*p* at the bow 11, or front region, of the marine vessel 10. The oblong handle 67 of the joystick 40*b* is rotated about the front point 72 such that the back portion of the oblong handle 67 including the back point 74 moves laterally away from the longitudinal centerline C1, but the front point 72 remains on the centerline C1.

The handle motion illustrated in FIG. 5D may be effectuated by a user pressing laterally leftward at or near the front end 67*a* of the oblong handle 67 to deflect just the front portion of the handle. Similarly, the handle motion illustrated in FIG. 5E may be effectuated by a user pressing laterally rightward at or near the back end 67*b* of the oblong handle 67 to deflect just the back portion of the handle. In some embodiments, one or more posts supporting the handle may be connected to a front detent resisting rotation of the front end 67*a* and a rear detent resisting rotation of the back end 67*b*. Thus, when lateral force is applied only to the front end 67*a*, the resistive force of the front detent is overcome and thus front end moves in response but the back end does not. Likewise, when lateral force is applied only to the back end 67*b*, the resistive force of the rear detent is overcome and thus the back end moves in response but the front end does not.

Figure 6B:
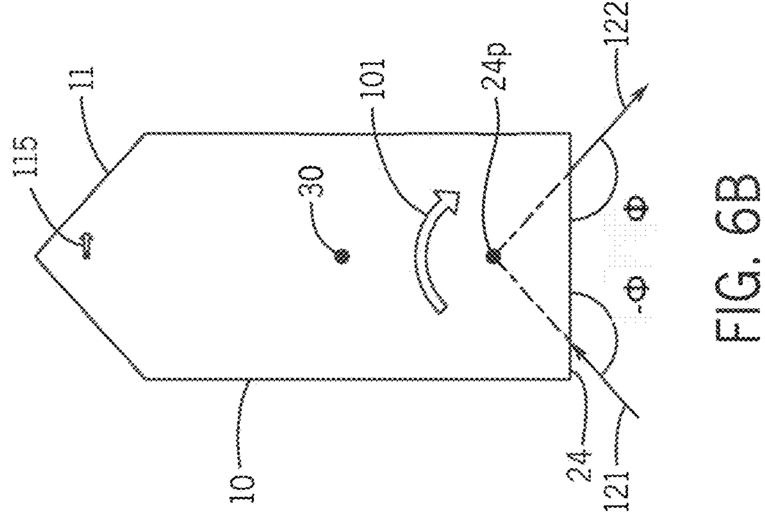
FIGS. 6A-6B depict combinations of thrust vectors by the exemplary propulsion system of FIG. 1 to effectuate exemplary isolated rotation movements of the bow or stern in accordance with the present disclosure.
Figure 6A:
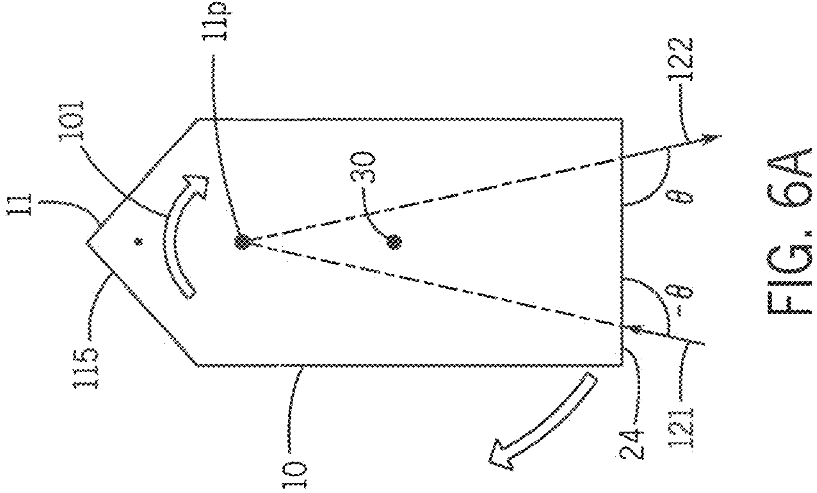

FIGS. 6A and 6B depict exemplary thrust vectors representing propulsion commands that may be executed in response to certain isolated rotation inputs. FIG. 6A represents thrust commands that may be executed to effectuate a rotation about the bow point 11*p*, which is in front (toward the bow) of the COT 30. The rear marine drives 21 and 22 are operated to generate forward and reverse thrusts 121 and 122 that cancel each other out and combine to generate a clockwise yaw thrust. The marine drives are splayed to opposite steering angles, where the first marine drive 21 is turned to steering angle −θ and the second marine drive 22 is turned to steering angle θ such that the thrust vectors 121 and 122 of the rear marine drives 21 and 22 intersect at the bow point 11*p*. The rear marine drives 21 and 22 are controlled to effectuate opposite thrust directions to generate the rotational propulsion that rotates the marine vessel 10 about the bow. The surge and yaw components of the thrusts cancel, resulting in only exerting a total yaw thrust, represented by arrow 101. Thereby, the bow 11 stays substantially at the same location and rotates in place, while the stern moves in around a large circle surrounding the bow point 11*p*.

FIG. 6B represents thrust commands that may be executed to effectuate a rotation about the stern point 24*p*. Here, the rear marine drives 21 and 22 are steered to opposing drive angles −Φ and Φ, where Φ is a greater magnitude angle and thus the drives are splayed out further from the centered steering position than the steering angle θ referred to in FIG. 6A. For example, Φ may be the maximum magnitude steering angle that can be effectuated within the steering constraints of the propulsion system. The thrusts effectuated by the rear marine drives 21 and 22 intersect at the stern point 24*p*, which is in behind (toward the stern) of the COT 30. Thus, when the marine drives 21 and 22 are operated to generate opposing thrusts, represented by vectors 121 and 122, a moment is generated resulting in a yaw force and exerting a total yaw thrust, which here is in a clockwise direction and represented by arrow 101. Thereby, the stern 24 stays substantially at the same location and rotates in place while the bow moves in a large circle surrounding the stern point 24*p*. In some embodiments, the lateral marine drive 15 is operated to provide additive yaw thrust to increase yaw from the rear marine drives 21 and 22. Thus, once the marine drives 21 and 22 are operated at a maximum output, the lateral marine drive 15 can be operated to generate a greater yaw velocity than is achievable with only the rear marine drives. Conversely, particularly where the lateral drive 15 is an electric thruster and the rear drives comprise engine powerheads, the lateral drive may also be operated to generate a low yaw velocity below the minimum output capabilities of the rear drives 21 and 22.

Figure 7:
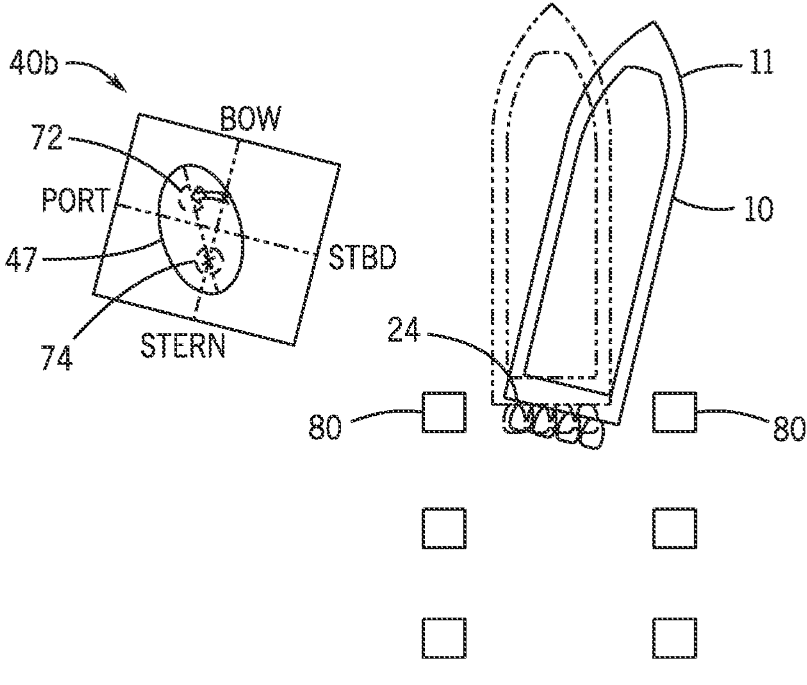
FIG. 7 illustrates an exemplary docking scenario and isolated rotation input at a joystick in accordance with one embodiment of the present disclosure.

FIG. 7 demonstrates a docking scenario where the isolated rotation input and propulsion control is useful to enable the vessel to maneuver into the docking space. Here, the vessel 10 is situated with the stern 24 between pillars 80. The vessel cannot be rotated about its natural center of turn 30 at or near the center of the vessel 10 because doing so will cause the stern 24 to collide with one of the pillars 80. Using the joystick 40*b*, the user can input an isolated rotation input to demand rotation of the vessel about the stern, thus keeping the stern substantially in place and moving the bow 11 to align the vessel 10 so that it can be backed up straight between the pillars 80. As described above with respect to FIG. 5D, the oblong handle 47 is rotated about the back point 74 to demand rotation of the vessel 10 about the stern 24. This moves the bow 11 in the port direction to align the vessel. The magnitude of the deflection of the front end 67*a* of the handle 67 dictates the magnitude of the movement of the bow 11, such as to command a rotational velocity of the bow 11. Thereby, the joystick 40*b* enables user control over the point of rotation of the vessel, as well as the speed and/or magnitude of the rotation.

The control system 33 is configured to control the marine drives 15, 21, 22 to effectuate the demanded isolated rotation of the vessel 10, which may be by a feedforward control strategy or a closed loop control strategy. In a closed loop strategy, the controller 34 may be configured to utilize yaw rate, such as from one or more inertial measurement units (IMUs) 26 or other sensing system capable of measuring yaw of the marine vessel 10, as the basis for controlling thrust magnitude and direction. For example, the control system 33 may include two IMUs (or other sensors capable of sensing yaw movement) to measure the rotational velocity at different points on the vessel, such as a front IMU 26*a* configured to measure the rotational velocity of the bow 11 and a rear IMU 26*b* configured to measure the rotational velocity of the stern 24. The sensed yaw rates can be used as feedback control for adjusting the thrust commands. Namely, the controller 34 may determine an expected yaw rate, or yaw velocity, of the bow or the stern (or both) associated with the isolated rotation demand from the joystick 40 (e.g., the joystick 40*b* with an oblong handle 67) and may compare the measured yaw rate from one or both of the IMUs 26*a* and 26*b* to the expected yaw rate and adjust the thrust commands to reduce the difference between the measured yaw rate and the expected yaw rate.

Figure 8:
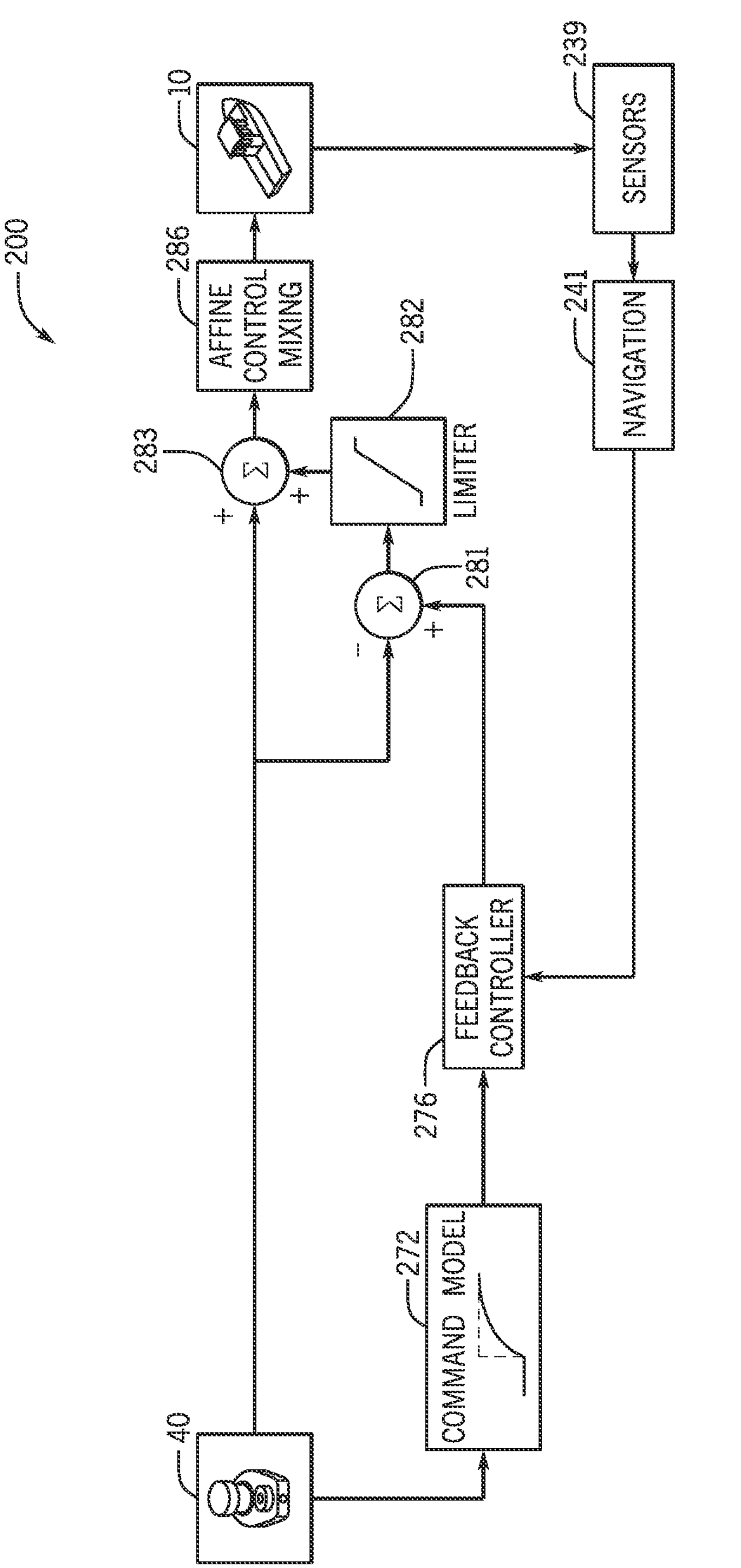
FIG. 8 is a diagram illustrating an exemplary method for controlling propulsion of the marine vessel based on joystick inputs in accordance with the present disclosure.

FIG. 8 is a flowchart schematically depicting one embodiment of a control method 200, such as implemented at the controller 34, for controlling low-speed propulsion of a marine vessel. The depicted method 200 may be implemented upon user engagement of a corresponding control mode to enable precision joystick control, such as a docking mode or other precision control mode. In the depicted embodiment, the control strategy is a closed-loop algorithm that incorporates feedback into the thrust command calculations by comparing a target inertial velocity or target acceleration to an actual measured velocity and/or measured acceleration of the marine vessel to provide accurate control that accounts for situational factors in the marine environment—e.g., wind and current—and any inaccuracies or uncertainties in the model. An affine control mixing strategy is utilized to convert surge (fore/aft) velocity demands, sway (starboard/port) velocity demands, and yaw velocity demands (including demands for isolated rotation about the bow or the stern) into values that can be used to control the marine drives, including thrust magnitude command values (e.g., demand percent, rotational speed, throttle position, current or torque amounts, etc.), thrust direction commands (e.g., forward or reverse), and steering commands for the steerable drives (e.g., angular steering position). Exemplary embodiments of each aspect of this control strategy are subsequently discussed.

Signals from the joystick user input device 40 (e.g., a percent deflection+/−100% in each of the axis directions and the position of each of the front point 72 and back point 74 of joystick 40*b*) are provided to the command model 272, which computes the desired inertial velocity or desired acceleration based on the raw joystick position information, including the desired point of rotation. The inertial velocity may include a surge velocity component, a sway velocity component, and/or a yaw velocity component, as well as a selected point of rotation for the yaw velocity. The command model 272 is configured based on the thrust capabilities of the drives and the vessel response to accurately approximate how fast the vessel will move and/or turn in accordance with the user input. For example, the command model 272 may include a map correlating positions of the joystick to inertial velocity values, associating each possible sensed position of the joystick to a target surge velocity, a target sway velocity, and/or a target yaw velocity of each of the bow and the stern.

Output from the command model 272, such as target surge, sway, and bow/stern yaw velocities (or could be desired surge, sway, and bow/stern yaw acceleration), is provided to the drive controller 276. The drive controller 276 is configured to determine thrust commands, including desired thrust magnitude and desired direction, for each of the drives 15, 21, and 22 based on the target surge, sway, and yaw velocities or accelerations. The drive controller 276 may be a model-based controller, such as implementing a vessel dynamics model (e.g., an inverse plant model), optimal control modeling, a robust servo rate controller, a model-based PID controller, or some other model-based control scheme. In a closed-loop vessel dynamics model controller embodiment, the model is utilized to both calculate feed-forward commands and incorporate feedback by comparing a target inertial velocity or target acceleration to an actual measured velocity and/or measured acceleration of the marine vessel. In a robust servo rate controller embodiment, the model is utilized to calculate feed-forward commands and the gains are computed off-line and incorporated into the control algorithm. In some embodiments, two or more different control models may be utilized, such as for calculating thrust commands for different directional control.

The control model is generated to represent the dynamics and behavior of the marine vessel 10 in response to the propulsion system 100, and thus to account for the hull characteristics and the propulsion system characteristics. The hull characteristics include, for example, vessel length, a vessel beam, a vessel weight, a hull type/shape, and the like. The propulsion system characteristics include, for example, the location and thrust capabilities of each marine drive in the propulsion system 100.

Alternatively, the drive controller 276 may implement a different, non-model-based, control strategy, such as a calibrated map correlating the target surge, target sway, and target yaw velocities/accelerations to thrust commands for each drive in the propulsion system 100 or a calibrated map correlating joystick positions to thrust commands for each drive in the propulsion system 100. Additionally, the map may be configured to account for further control parameters in the thrust command determinations, such as battery charge level (e.g., battery SOC), of a power storage system associated with one or more of the marine drives 15, 21, 22, generated fault conditions for one or more of the marine drives 15, 21, 22, or the like, whereby each control parameter is represented as an axis on the map and a corresponding input is provided for determining the thrust commands.

The output of the drive controller 276 is compared to the joystick position information at summing point 281. The summed output is again subject to a limiter 282, which limits the authority of the controller 276 and accounts for fault modes. The output of the limiter 282 is summed with the joystick values at summing point 283. That summed value is provided to the affine control mixer 286, which generates a total X and Y direction command for the marine drive. From there, the powerhead control commands, shift/motor direction commands, and steering actuator control commands (for the steerable drives) are determined for each marine drive 15, 21, 22. An exemplary embodiment of affine mixing is described in U.S. Pat. No. 10,926,855, which is incorporated herein by reference.

In the closed-loop control strategy depicted in FIG. 8, the drive controller 276 is configured to determine the thrust commands based further on a comparison of the target values outputted from the command model 272, namely target surge velocity, target sway velocity, and/or target yaw velocity, to measured velocity and/or acceleration from one or more inertial and/or navigation sensors. Feedback information about the actual vessel velocity and/or acceleration is provided by one or more sensors and/or navigation systems on the marine vessel. For example, the output of the one or more velocity and/or acceleration sensors 239—such as the IMUs 26*a* and 26*b*, accelerometers, gyros, magnetometers, etc.—may be interpreted and/or augmented by a navigation system 241, such as a GPS 38 or an inertial navigation system. The sensors 239 and the navigation system 241 provide an actual inertial velocity (e.g., sway velocity and bow/stern yaw velocities) and/or actual acceleration values that can be compared to the output of the command model 272. The feedback controller 276 is configured to utilize such information to refine the thrust command values to accurately effectuate the desired inertial velocity, accounting for inaccuracies in the model design, malfunctions or subpar performance of the marine drives, disturbances in the environment (e.g., wind, waves, and current), and other interferences.

Where the controller 276 is instead a map-based drive controller, a PID controller may be utilized in conjunction with the map-determined thrust commands to determine the final outputted thrust commands and provide closed-loop control.

Alternatively, control may be implemented in an open-loop, or feed-forward, control strategy. In a feed-forward-only command regime, the output of the drive controller 276 is utilized to control the marine drives—i.e., inputted to the affine control mixer 286 to generate engine and steering commands. Accordingly, the command model 272, drive controller 276, and affine control mixer 286 can be utilized, without the feedback portion of the system depicted in FIG. 8, to control the marine drives 15, 21, 22 in a joysticking mode. This control strategy, which results in a very drivable and safe propulsion system 100, can be implemented on its own as a control strategy or can be implemented as a default state when the feedback portion of a closed-loop control system is inoperable (such as due to failure of navigation systems or sensors). Alternatively, a map-based solution may be used in a feed-forward control strategy where the joystick position information (e.g., a percent deflection+/−100% in each of the axis directions and the position of each of the front point 72 and back point 74) is correlated to a predefined output value for each of the drives 15, 21, 22 or some subset of drives.

Figure 9:
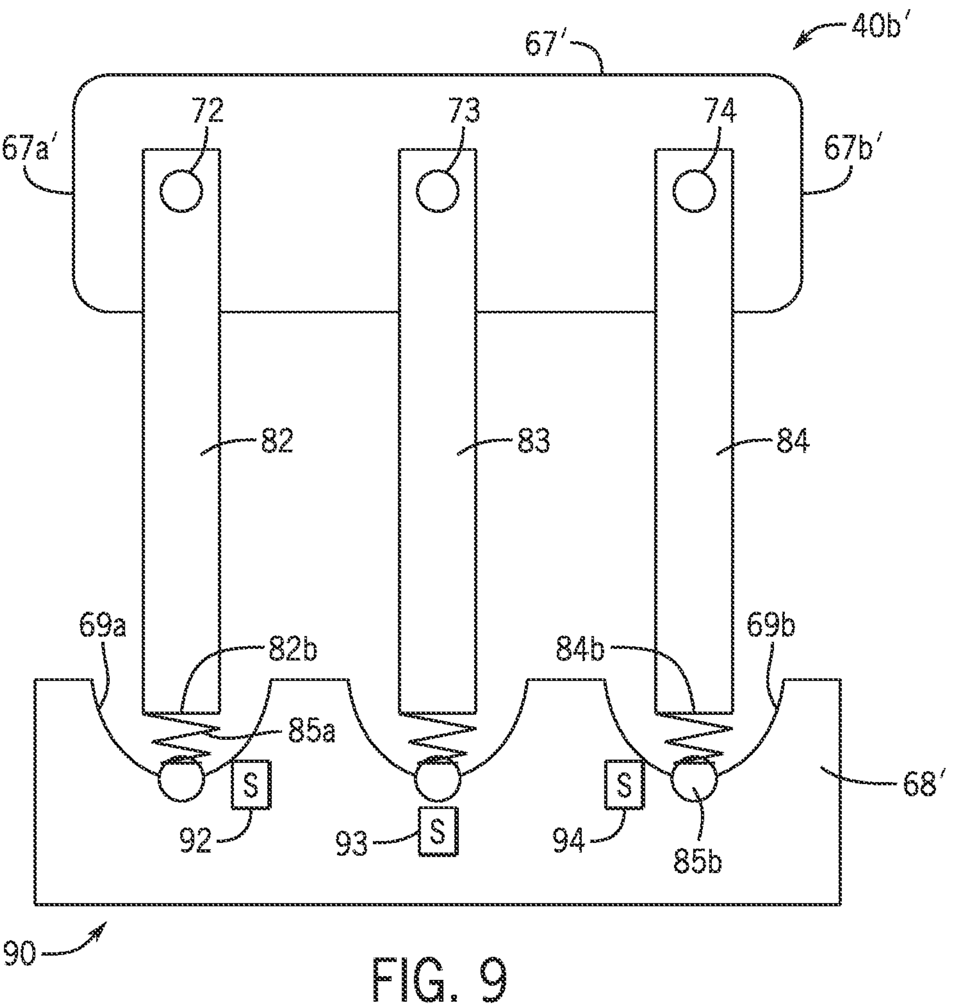
FIG. 9 is a diagram illustrating another embodiment of a joystick configured to facilitate an isolated rotation input in accordance with the present disclosure.

FIG. 9 depicts a cross-sectional view an embodiment of a joystick 40*b*' having an oblong handle 67'. The oblong handle 67' is connected to three posts, including a front post 82, a center post 83, and a rear post 84. Each post 72-74 connects between the oblong handle 67' and the base 68'. The front post 82 is connected to the oblong handle 67' at the front point 72 and the back post 84 is connected to the oblong handle at the back point 74. The center post is connected to the oblong handle 67' at a center point 73.

The posts 82-84 may be rigidly connected to the handle 67' and may be configured to move laterally and rotationally within the base 68'. Alternatively, one or more of the posts 82-84 may be rotationally connected to the handle 67'. The bottom ends 82*b* and 84*b* of each of the front and back posts 82 and 84 may be configured as detent arrangements, such as where the bottom ends 82*a* and 82*b* engage the base 68' via detent arrangements that resist or arrest movement of each of the posts 82 and 84 from their neutral position on the centerline C1. The bottom end of the center post 83 may also comprise or connect to a detent, as shown, or may be configured to be rotated laterally and in place similar to existing joystick arrangements. In an embodiment where the bottom end of the center post 83 moves about a fixed point in the base, the center post 83 may be rotationally connected to the handle 67'.

In the example at FIG. 9, the detent arrangements include a spring-operated ball **85*a* and 85*b* at the bottom 82*b*, 84*b* of each post 82, 84, and also on the center post 83. Each spring-operated ball 85*a*, 85*b* engages a respective trough 69*a*, 69*b* in the base 68'. Each trough 69*a*, 69*b* is shaped to arrest motion of the joystick away from the neutral position, or at least to resist lateral movement of the front and back ends 67*a*' and 67*b*' away from the longitudinal centerline C1. In certain embodiments, the troughs 69*a* and 69*b* may be bowl-shaped or progressively sloped upwards around the neutral position location of the post bottoms 82*b* and 84*b*—i.e., the lowest point of the troughs 69*a* and 69*b* are aligned with the locations of the post bottoms 82*b* and 84*b* when the joystick 40*b*' is in the neutral position. As either end 67*a*' or 67*b*' is rotated by applying a lateral force to that end, the spring-operated ball 85*a*, 85*b* is compressed and forced upward in the trough. If the force is removed, the compression spring of the spring-operated ball 85*a*, 85*b* expands, forcing the ball back to the center of the trough 69*a*, 69*b* and forcing the handle 67'** back to the neutral position.

A joystick sensor system 90 is configured to identify a position of each of the front point 72 and the back point 74 of the oblong handle 67'. In the embodiment at FIG. 9 the joystick sensor system 90 includes a front position sensor 92 configured to sense a position of the front post 82 and a back position sensor 94 configured to sense a position of the back post 84. By sensing the position of the respective posts 82 and 84, the front and back position sensors 92 and 94 identify the positions of the front and back points 72 and 74. Accordingly, the front and back position sensors 92 and 94 are configured to at least sense the lateral position of each of the front and back posts 82 and 84, such as a distance from the longitudinal centerline C1. For example, the front and back position sensors 92 and 94 may each be a potentiometer configured to sense the lateral position of the respective front post 82 and back post 84. Alternatively, one or both of the front and back position sensors 92 and 94 may be configured to sense both a rotational position and a lateral position of the respective front and back posts 82 and 84. Thus, the position sensors 92 and 94 may be configured to sense the position of the front and back posts 82 and 84 in 2D or 3D space. For instance, the position sensors 92 and 94 may each be Hall effect sensors configured to determine the position of each of the front post 82 (and thus the front point 72) and the back post 84 (and thus the back point 74) in a plane defined by the longitudinal centerline C1 and the lateral centerline C2, and thus to determine the lateral and rotational positions of each of the posts 82 and 84.

The embodiment shown in FIG. 9 also includes a center post 83 connected to the handle 67' at a center point 73. The center post 83 is associated with a center position sensor 93 configured to sense a lateral and/or a rotational position thereof, such as a potentiometer configured to sense the lateral position of the post 83 or could be a 2D or 3D location sensor. For example, the central position sensor may be a Hall effect sensor arrangement configured to sense the planar and/or vertical position of the center post 83 to provide the rotational position thereof. If one of the handle ends **67*a*' or 67*b*' is deflected laterally, thus to provide the isolated rotation input, the center post 83 is also deflected laterally away from the longitudinal centerline C1 (e.g., see FIG. 7). Such a movement would be detected by the center position sensor 93**.

The joystick sensor system 90 includes sensors sufficient to determine the positions of each of the front point 72 and the back point 74. This may include some subset of the sensors 92-94. For example, the sensor system 90 may include only a front sensor 92 and a back sensor 94, which may be hall effect sensors configured to determine both the lateral and rotational positions of the front and back points 72 and 74. Alternatively, the sensor system 90 may include only the center position sensor 93 configured to determine both the lateral and rotational position of the center point 73. Knowing the lateral and rotational center position 73 provides sufficient information to calculate the front and back points 72 and 74—i.e., based on their known distance from the center point 73. In still other embodiments, different sensor combinations may be provided, such as where the front and back position sensors 92 and 94 are configured to sense the lateral position of each of the front and back points 72 and 74 center position sensor is configured to determine the rotational position.

Likewise, the joystick **40*b*' may include any number of one or more posts connecting the handle 67' to the base 68'. For example, only front and back posts 82 and 84 may support the handle 67' and the center post 83 may be eliminated. Alternatively, only a center post 83 may be provided to support and elevate the handle 67'. In such an embodiment, the positions of the front and back points 72 and 74 may be calculated based on the rotational and lateral positions of the center post 83, as described above. Alternatively, the center post 83 may be connected to an elongated element inside the base that moves in parallel with the handle 67' and provides a means for sensing the position of the front and back points and effectuating resistance to movement of the front and back ends 67*a*' and 67*b*'**, such as via detents.

Figure 10:
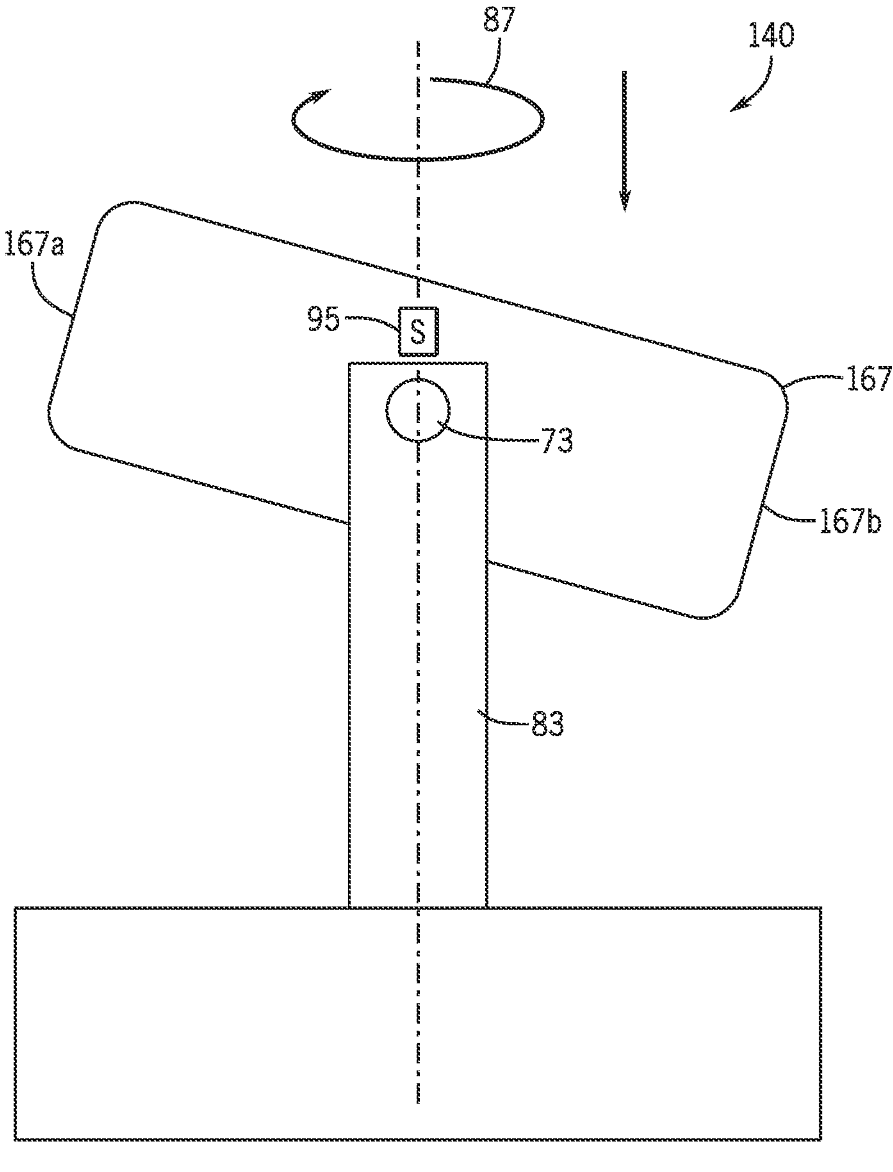
FIG. 10 is a diagram illustrating another embodiment of a joystick configured to facilitate an isolated rotation input in accordance with the present disclosure.
Figure 11B:
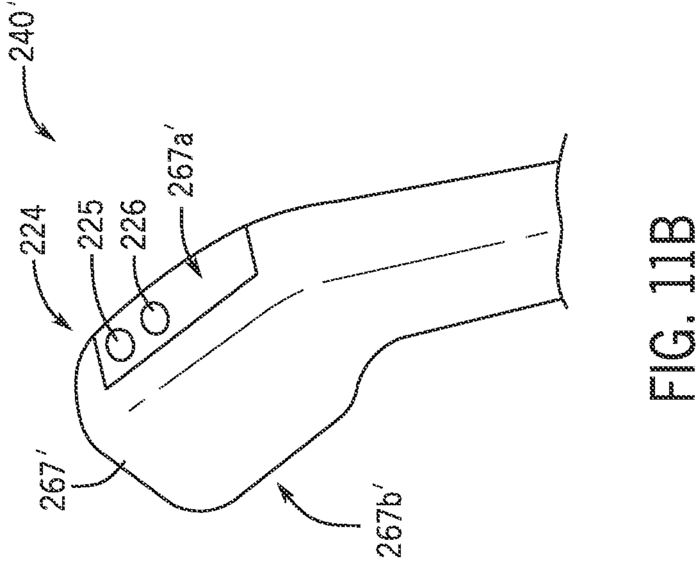
FIGS. 11A-11B illustrate still other embodiments of joysticks configured to facilitate an isolated rotation input in accordance with the present disclosure.
Figure 11A:
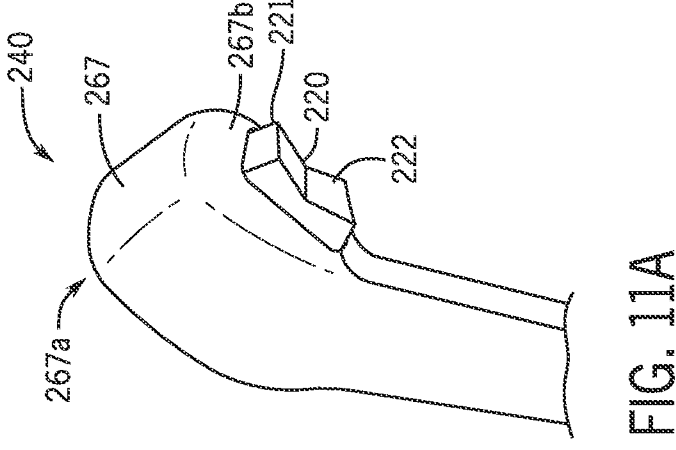

In other embodiments, the joystick may include a selection device configured to enable the user to select the rotation point—e.g., rotation about the bow 11 or rotation about the stern 24. FIGS. 10, 11A, and 11B depict exemplary embodiments of joysticks with selection devices enabling a user to select rotation about the bow or stern of the vessel 10. In the example of FIG. 10, the handle 167 is rotatable forward and rearward about a connection point to the center post 83, which in this example is the center point 73. Rotation of the handle 167 is performed to select the point of rotation of the vessel 10, where rotation rearward (as shown) such that the back end **167*b* moves down and the front end 167*a* moves up selects rotation about the stern 24. Similarly, rotation forward such that the back end 167*b* moves up and the front end 167*a* moves down selects rotation about the bow 11. Thus, the rotational position of the handle provides joystick position information selecting the point of rotation for the marine vessel. Here, the isolated rotation input includes rotating the handle 167 forward or rearward while the joystick handle 167 is rotated about its center axis 87, where the demanded rotational direction of about the selected bow or stern rotation points is dictated by the direction of rotation of the handle 167 and the magnitude of rotation about the center axis 87, the yaw demand input, controls the magnitude of the commanded rotation. If the handle 167 remains in the horizontal position, and thus is not rotated forward or backward, then the selected point of rotation is the center (e.g., the COT 30**).

The joystick sensor system may include a handle position sensor 95 configured to detect forward and back rotation of the handle 167 to identify the demand for rotation about the bow and the stern, respectively. For example, the handle position sensor may be a rotary position sensor or another type of sensor configured to identify when the handle 167 is rotated forward or rearward. Movement of the center post 83 may be sensed by a center position sensor, as described above, or any other types of sensing arrangement utilized in existing marine joystick arrangements with one joystick post moved as described above with respect to FIG. 3.

FIGS. 11A and 11B are exemplary joysticks 240 with different selection devices configured to enable the user to select the rotation point. In FIG. 11A, the joystick handle 267 includes a toggle switch 220 configured to enable selection of the bow or stern rotation points. Each side of the toggle switch 220 is associated with one of the bow rotation selection or the stern rotation selection, depending on where the toggle switch 220 is mounted on the joystick 240 or joystick handle 267. In the example shown in FIG. 11A, the toggle switch 220 is mounted on the front side 267*a* of the joystick handle 267 (away from the user) to be convenient for a user to select and press the top side 221 of the toggle switch 220, such as to select the bow 11 as the point of rotation, and to press the bottom side 222 of the toggle switch 220 to select the stern 24 as the point of rotation. If neither side of the toggle switch is pressed, then the selected point of rotation is the center (e.g., the COT 30). In other embodiments, the toggle switch may be mounted on the top, side, or back side 267*b* (toward the user) of the joystick handle 267 or may be positioned on the joystick base. The handle 267 is then rotated clockwise or counterclockwise to instruct the rotational direction about the selected bow or stern rotation points, and the magnitude of the handle rotation dictates the magnitude of the demanded rotation.

In other embodiments, the selection device may instead be a slide switch or any other switch arrangement that enables user selection of one of at least two positions that can be associated with selection of the front and rear points of rotation. The switch arrangement may be configured to enable the user to select one of three positions, one position associated with each of the front, center, and rear points of rotation. For example, the switch selection device may be a three-position slide switch.

In the example in FIG. 11B, the selection device is a set of buttons 224, including a first button 225 depressible to select rotation about the bow and a second button 226 depressible to select rotation about the stern. If neither button 225 or 226 is pressed, then the selected point of rotation is the center (e.g., the COT 30). In the depicted embodiment, the set of buttons 224 is positioned on the back side 267*b*' of the joystick handle 267' (toward the user), for example so that the user can depress either one of the buttons with their thumb when operating the joystick 240'. In other embodiments, the set of buttons 224 may be positioned on the top, side, or front 267*a*' (away from the user) of the joystick handle 267' or may be positioned on the joystick base. The set of buttons 224 may be positioned together adjacent to one another or may be split up. For example, the first button 225 may be positioned on the front side 267*a*' of the joystick handle 267' and depressible to select the bow point of rotation and the second button 226 may be positioned on the back side 267*b*' of the handle 267' and depressible to select the stern point of rotation. In other embodiments, the selection device may be a different input element, such as a track point (sometimes referred to as a pointing stick), a track pad, or other touch input device configured for the user to selection the front and rear points of rotation. The touch input element may be arranged anywhere on the joystick handle or base, such as configured for the user to press in a forward direction or touch a front end of the touch input element to select the bow point of rotation and to press in a rearward direction or press on a back end of the touch input element to select the stern point of rotation. The direction and magnitude of the joystick rotation then dictates the direction and magnitude of the demanded vessel rotation about that point, as described above.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A marine propulsion control system for a marine vessel comprising:

a plurality of marine drives configured to propel the marine vessel in each of a surge direction, a sway direction, and a yaw direction, wherein the plurality of marine drives includes at least two rear marine drives;

a joystick configured to receive an isolated rotation input to demand rotation about a bow of the marine vessel or rotation about a stern of the marine vessel, and to receive a surge demand input, a sway demand input, and a yaw demand input, wherein each of the surge demand input, the sway demand input, and the yaw demand input includes a magnitude and a direction;

wherein the joystick includes an oblong handle having a length that is aligned with a long axis of the marine vessel and a width that is less than the length;

a control system configured to:

control the plurality of marine drives to effectuate vessel rotation about the bow of the marine vessel or about the stern of the marine vessel based on the isolated rotation input and the yaw demand input, and to effectuate surge movement of the marine vessel based on the surge demand input, and sway movement of the marine vessel based on the sway demand input; and wherein controlling the plurality of marine drives to effectuate the rotation about the bow of the marine vessel and the rotation about the stern of the marine vessel includes adjusting a splay angle between the at least two rear marine drives to control a point of rotation of the marine vessel based on the isolated rotation input, wherein the splay angle between the at least two marine drives is an angle less than 180 degrees.

2. The system of claim 1, wherein the oblong handle is connected to at least one post connected to a rear detent that facilitates deflection of only a front of the oblong handle in response to a lateral force on the front to demand the rotation about the stern of the marine vessel and a front detent that facilitates deflection of only a back of the oblong handle in response to lateral force on the back to demand the rotation about the bow of the marine vessel.

3. The system of claim 1, wherein the oblong handle is connected to at least two posts, including a front post engaging a base of the joystick via a front detent such that the oblong handle is rotatable about the front post to demand the rotation about the bow of the marine vessel, and a back post engaging the base via a back detent such that the oblong handle is rotatable about the back post to demand the rotation about the stern of the marine vessel.

4. The system of claim 1, further comprising a sensor system configured to identify a position of each of a front point on the oblong handle and a back point on the oblong handle, and wherein the control system is configured to identify the isolated rotation input based on the position of each of the front point and the back point on the oblong handle.

5. The system of claim 4, wherein the sensor system includes a center position sensor configured to sense a rotational position and a lateral position of a center post connected to the oblong handle, and wherein the control system is configured to calculate the position of each of the front point and the back point on the oblong handle based on the rotational position and the lateral position of the center post.

6. The system of claim 4, wherein the sensor system includes at least a front position sensor configured to sense at least a lateral position of a front post to identify the position of the front point on the oblong handle and a rear position sensor configured to sense at least a lateral position of a rear post to identify the position of the back point on the oblong handle.

7. The system of claim 1, wherein the joystick includes a handle that is configured to rotate forward and rearward about a connection point of the handle to a center post, and wherein the rotation of the handle forward selects the rotation about the bow and rotation of the handle rearward selects the rotation about the stern.

8. The system of claim 1, wherein the plurality of marine drives includes at least one rear marine drive and at least one lateral marine drive, and wherein the control system is configured to control steering and thrust of the at least one rear marine drive and to control thrust of the at least one lateral marine drive to control a point of rotation of the marine vessel and effectuate the rotation about the bow of the marine vessel and the rotation about the stern of the marine vessel.

9. The system of claim 1, wherein the joystick is configured such that the oblong handle is movable as a single unit to generate joystick position information from which the isolated rotation input, the surge demand input, the sway demand input, and the yaw demand input are determined.

10. The system of claim 1, wherein the control system is further configured to control at least one steering actuator such that the at least two rear marine drives are splayed at a first splay angle when the isolated rotation input demands rotation about the bow of the marine vessel and are splayed at a second splay angle when the isolated rotation input demands rotation about the stern of the marine vessel, wherein the second splay angle has a larger magnitude than the first splay angle.

11. The system of claim 1, wherein the control system is further configured to, in response to the isolated rotation input demanding rotation about the stern of the marine vessel, control at least one lateral marine drive at the bow of the marine vessel based on the yaw demand to effectuate the rotation about the stern of the marine vessel.

12. A method of controlling propulsion for a marine vessel, the method comprising:

receiving joystick position information;

based on the joystick position information, identifying an isolated rotation input demanding rotation about a bow of the marine vessel or rotation about a stern of the marine vessel and providing a surge demand input, a sway demand input, and a yaw demand input, wherein each of the surge demand input, the sway demand input, and the yaw demand input includes a magnitude and a direction;

controlling a steering and thrust of a plurality of marine drives, including at least two rear marine drives, to effectuate vessel rotation about the bow of the marine vessel or about the stern of the marine vessel based on the isolated rotation input and the yaw demand input and to effectuate vessel translation based on the surge demand input and the sway demand input; and wherein controlling steering of the at least two rear marine drives to effectuate the rotation about the bow of the marine vessel and the rotation about the stern of the marine vessel includes adjusting a splay angle between the at least two rear marine drives to control a point of rotation of the marine vessel based on the isolated rotation input, wherein the splay angle between the at least two marine drives is an angle less than 180 degrees.

13. The method of claim 12, further comprising:

identifying a position of each of a front point on an oblong handle and a back point on the oblong handle on the joystick; and wherein identifying the isolated rotation input based on the joystick position information includes identifying the isolated rotation input based on the position of each of the front point and the back point.

14. The method of claim 13, further comprising receiving a rotational position and a lateral position of a center post connected to an oblong handle of the joystick, and wherein the position of each of the front point and the back point on the oblong handle are identified based on the rotational position and the lateral position of the center post.

15. The method of claim 13, further comprising receiving a position of a front post from a front position sensor to identify the position of the front point on the oblong handle and a position of a rear post from a rear position sensor to identify the position of the back point on the oblong handle.

16. The method of claim 12, wherein a speed of rotation about the bow or the stern is controlled based the yaw demand and a direction of rotation about the bow or the stern is controlled based on a direction of rotation of the joystick.

17. The method of claim 12, wherein controlling the plurality of marine drives further includes controlling at least one lateral marine drive to control a point of rotation of the marine vessel and effectuate the rotation about the bow of the marine vessel or the stern of the marine vessel based on the isolated rotation input and the yaw demand.

18. The method of claim 12, further comprising controlling at least one steering actuator to splay the marine drives at a first splay angle when the isolated rotation input demands rotation about the bow of the marine vessel and at a second splay angle when the isolated rotation input demands rotation about the stern of the marine vessel, wherein the second splay angle has a larger magnitude than the first splay angle.

19. The method of claim 12, further comprising, in response to the isolated rotation input demanding rotation about the stern of the marine vessel, controlling at least one lateral marine drive at the bow of the marine vessel based on the yaw demand to effectuate the rotation about the stern of the marine vessel.

* * * * *